US012077004B2

(12) United States Patent
Murata

(10) Patent No.: US 12,077,004 B2
(45) Date of Patent: Sep. 3, 2024

(54) PRINTER

(71) Applicant: TOSHIBA TEC KABUSHIKI KAISHA, Tokyo (JP)

(72) Inventor: Tomomasa Murata, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 17/703,878

(22) Filed: Mar. 24, 2022

(65) Prior Publication Data

US 2023/0302819 A1 Sep. 28, 2023

(51) Int. Cl.

| | |
|---|---|
| ***B41J 2/335*** | (2006.01) |
| ***B41J 2/32*** | (2006.01) |
| ***B41J 2/325*** | (2006.01) |
| ***B41J 11/04*** | (2006.01) |
| ***B41J 11/14*** | (2006.01) |

(52) U.S. Cl.

CPC ............. *B41J 2/33505* (2013.01); *B41J 2/32* (2013.01); *B41J 2/325* (2013.01); *B41J 11/04* (2013.01); *B41J 11/14* (2013.01)

(58) Field of Classification Search

CPC . B41J 2/33505; B41J 2/32; B41J 2/325; B41J 11/04; B41J 11/14

See application file for complete search history.

(56) References Cited

U.S. PATENT DOCUMENTS

| | | | | |
|---|---|---|---|---|
| 2011/0214820 A1* | 9/2011 | Sato | B65C 9/46 156/764 |
| 2013/0125771 A1* | 5/2013 | Colquitt | B41F 27/00 101/479 |
| 2021/0252882 A1* | 8/2021 | Sanada | B41J 11/04 |

FOREIGN PATENT DOCUMENTS

JP H09-131945 A 5/1997

OTHER PUBLICATIONS

Extended European Search Report dated Jul. 3, 2023 issued in European Patent Application No. 22204093.3, 10 pages.

* cited by examiner

*Primary Examiner* — Yaovi M Ameh

(74) *Attorney, Agent, or Firm* — FOLEY & LARDNER LLP

(57) ABSTRACT

A printer including thermal head, a platen including a shaft, a pair of bushing, a bracket, a pair of frames, and a pair of supports. The bushings are positioned proximate opposing ends of the shaft. The bracket is configured to support the thermal head. The bracket defines a groove at opposing ends thereof. The frames are positioned proximate the opposing ends of the bracket. Each of the frames defines an aperture that cooperates with the groove to define a passage through which a portion of the shaft extends. Each of the supports is positioned to engage with the aperture of a respective one of the frames. The supports are rotatable within the apertures about an axis of rotation. The supports are positioned to support the opposing ends of the shaft such that the shaft is eccentric from the axis of rotation.

19 Claims, 7 Drawing Sheets

PRINTER

FIELD

Embodiments described herein relate generally to a printer.

BACKGROUND

According to the related art, a printer that prints on a paper while conveying the paper by a thermal head provided with heat generation elements laid in a line and a roller-like platen is used. In such a printer, the contact position between the thermal head and the platen may affect print quality. Therefore, some related-art printers have a structure for adjusting the contact position between the thermal head and the platen.

Such a structure changes the contact position between the thermal head and the platen to a plurality of different positions along the direction of conveyance of paper. For example, in a printer having such a structure, for a firm paper, the position of the platen is located upstream of the heat generation elements of the thermal head, whereas for a thin flexible paper, for example, the position of the platen is located downstream of the heat generation elements of the thermal head.

However, the related-art structure implementing such adjustments is not simple and therefore is not provided in a low-priced printer. Also, since the structure is not simple, an internal space for installing the structure is required.

In view of these circumstances, it is desired to provide a printer in which a structure for adjusting the contact position between the thermal head and the platen is provided inexpensively and in a small space.

DETAILED DESCRIPTION

In general, according to an embodiment, a printer includes a thermal head, a roller-like platen, a pair of frames, a pair of cylindrical parts, a bracket, and a support part. The thermal head is provided with a plurality of heat generation elements arranged in a line. The roller-like platen conveys a printing medium held between the platen and the thermal head. The pair of frames have a hole for supporting a shaft of the platen and hold the platen between the frames in an axial direction. The pair of cylindrical parts have a cylindrical shape with a greater inner diameter than the outer diameter of the shaft and surround each end part of the shaft. The bracket has, at two end parts thereof, a part for holding the cylindrical parts from both sides, and supports the thermal head. The support part is configured as a pair of support parts that are fitted in the hole in the frames, are rotatable about the hole in the frames, locate the cylindrical parts coaxially with the axis of this rotation, and support the shaft in a state of being eccentric from the axis of the rotation. A rotation stopper defines a rotational position of the support part in such a way as to be able to set a contact position between the thermal head and the platen, which changes according to the angle of the rotation of the support part, to a plurality of positions.

An embodiment of the printer will now be described in detail with reference to the accompanying drawings. The embodiment described below is an embodiment of a label attaching device. The configuration, specifications and the like thereof are not limited.

Figure 1:
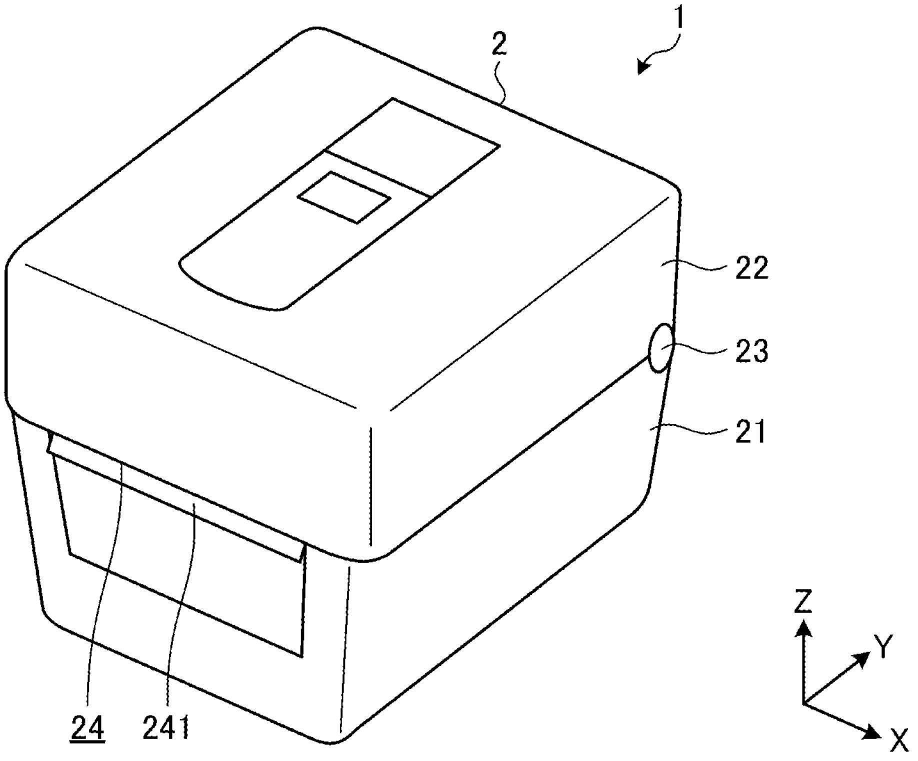
FIG. 1 is a perspective view schematically showing an example of the external appearance of a printer according to an embodiment.
Figure 2:
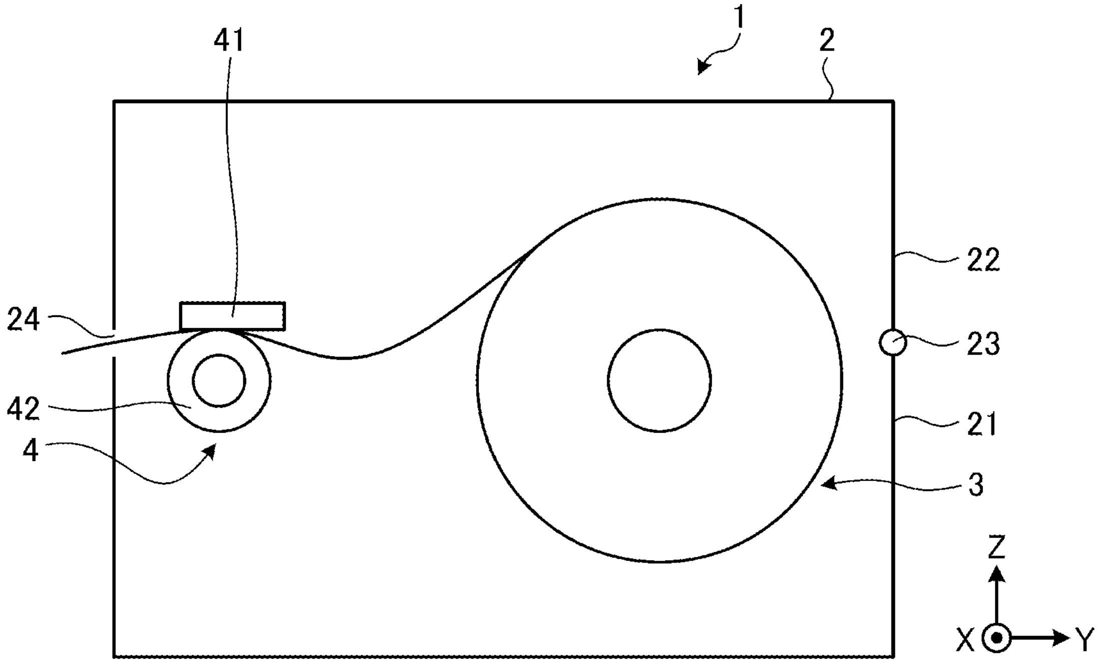
FIG. 2 is a cross-sectional view schematically showing an example of the internal structure of the printer.

FIG. 1 is a perspective view schematically showing an example of the external appearance of a printer 1 according to one embodiment. FIG. 2 is a cross-sectional view schematically showing an example of the internal structure of the printer 1 according to one embodiment.

In the description below, a three-dimensional orthogonal coordinate system formed by an X-axis, a Y-axis, and a Z-axis is used. The X-axis represents the direction of the width of the printer 1 (left-right direction). The Y-axis represents the direction of the depth of the printer 1 (front-back direction). The Z-axis represents the direction of the height of the printer 1 (up-down direction). In the illustrations, a direction indicated by an arrow is a positive direction. The positive direction along the Y-axis represents the rear side of the printer 1. The positive direction along the Z-axis represents the upper side.

According to one embodiment, the printer 1 is configured to print on a roll of paper and has a casing 2, a paper support or paper container unit 3, a printing mechanism or printing unit 4, and the like. The roll of paper is an example of a printing medium and is a roll of strip-like paper, for example. The strip-like paper may include a strip-like pasteboard paper and a label having a glue layer at the back of a printing surface and attached on the pasteboard paper. The casing 2 has a main body part 21 and a cover 22, and has the paper container unit 3 and the printing unit 4 disposed therein. The paper container unit 3 supports and/or contains the roll or paper in such a way that the paper can be drawn out. The printing unit 4 is formed by a thermal head 41 and a platen 42. The printing unit 4 prints on the paper drawn out of the paper container unit 3.

The main body part 21 is, for example, a box-shaped container having an opening. At the front of the main body part 21, a paper discharge port 24 is provided. The paper discharge port 24 is an opening for discharging the paper after printing. The paper discharge port 24 has a paper support 241. The paper support 241 is in contact with the lower side of the paper discharged from the paper discharge port 24 and thus supports the paper.

One end of the cover 22 is supported in a rotationally movable or pivotable manner to the main body part 21 via a shaft 23. With the rotational movement, the cover 22 moves between a first position for opening the main body part 21 and the cover 22, and accessing the interior of the casing 2 (an open position) and a second position for closing the main body part 21 and the cover 22 (a closed position). With the movement of the cover 22, the paper container unit 3 may, thereby, be opened and closed. The cover 22 may be energized or biased in a direction from the closed position toward the open position (e.g., in a direction away from the main body part 21) by an energizing or biasing member such as a spring (e.g., a torsional spring, a linear spring, etc.).

The thermal head 41 is attached to/positioned at a distant position from the shaft 23, inside the cover 22. The platen 42 is provided at a position facing the thermal head 41, inside the main body part 21. In the state where the cover 22 is at the closed position, the platen 42 comes into contact with the thermal head 41, thus making the printing unit 4 ready for printing. More specifically, the thermal head 41 is attached to the cover 22 in a rotationally movable manner about an axis along the direction of the width (X-axis direction) and is biased/energized by an elastic member such as a spring in a direction of being pressed in contact with the platen 42 in the state where the cover 22 is at the closed position.

The thermal head 41 may include a plurality of heat generation elements (e.g., arranged in a line). The thermal head 41 selectively drives the heat generation elements to heat a thermal color development layer provided at the printing surface of the paper and thus causes the thermal color development layer to develop color and, thereby, print on the paper. The platen 42 is a roller-like member. The platen 42 holds the paper between the platen 42 and the thermal head 41, rotates about an axis laid in its longitudinal direction, and thus draws out and conveys the paper from the paper container unit 3.

Figure 3:
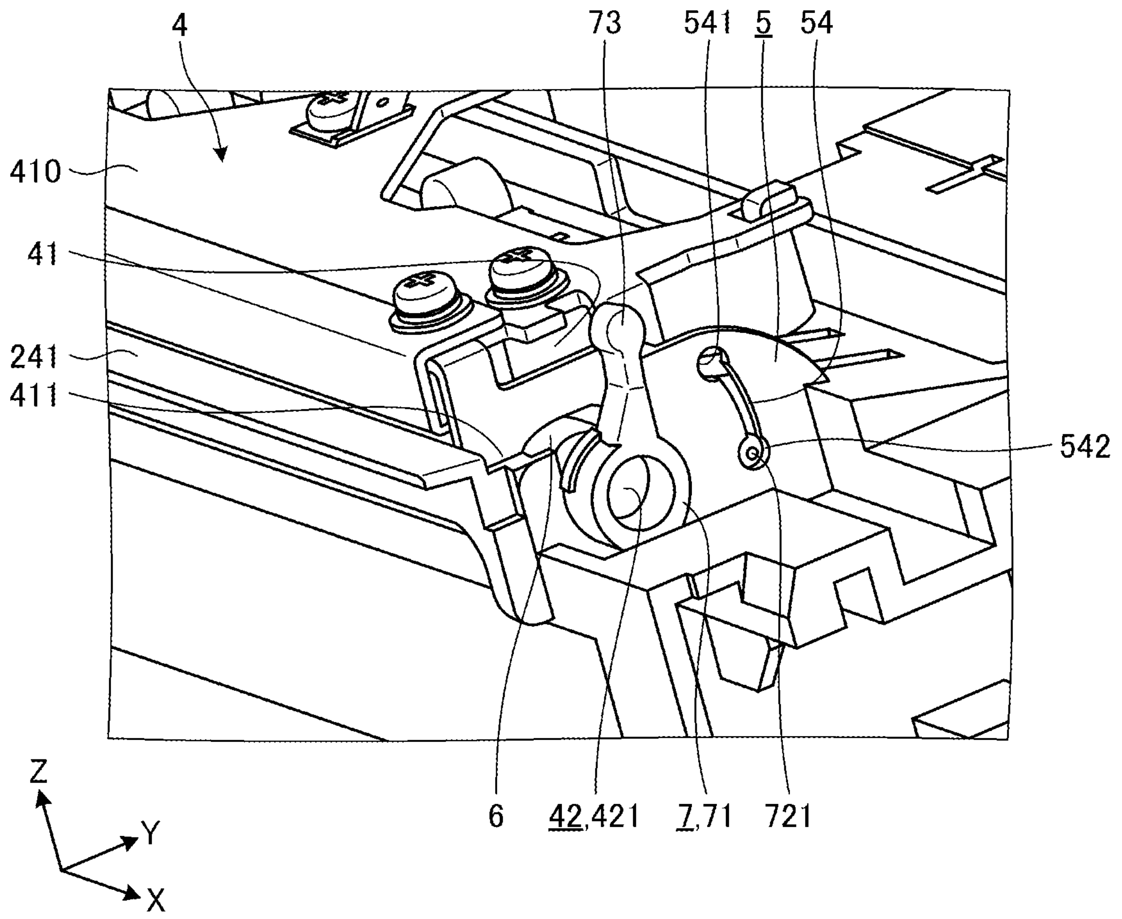
FIG. 3 is a perspective view showing an example of a support structure for a platen.

FIG. 3 is a perspective view showing an example of a support structure for the platen 42. In FIG. 3, the thermal head 41 is at the position corresponding to the state where the casing 2 is closed, and the thermal head 41 is in contact with the platen 42. The platen 42 is rotatably supported at two end parts thereof by a pair of frames 5. The frames 5 are a pair of plate members parallel to a YZ plane. The frames 5 are provided inside the main body part 21 and located on both sides of the platen 42 in the axial direction.

Figure 4:
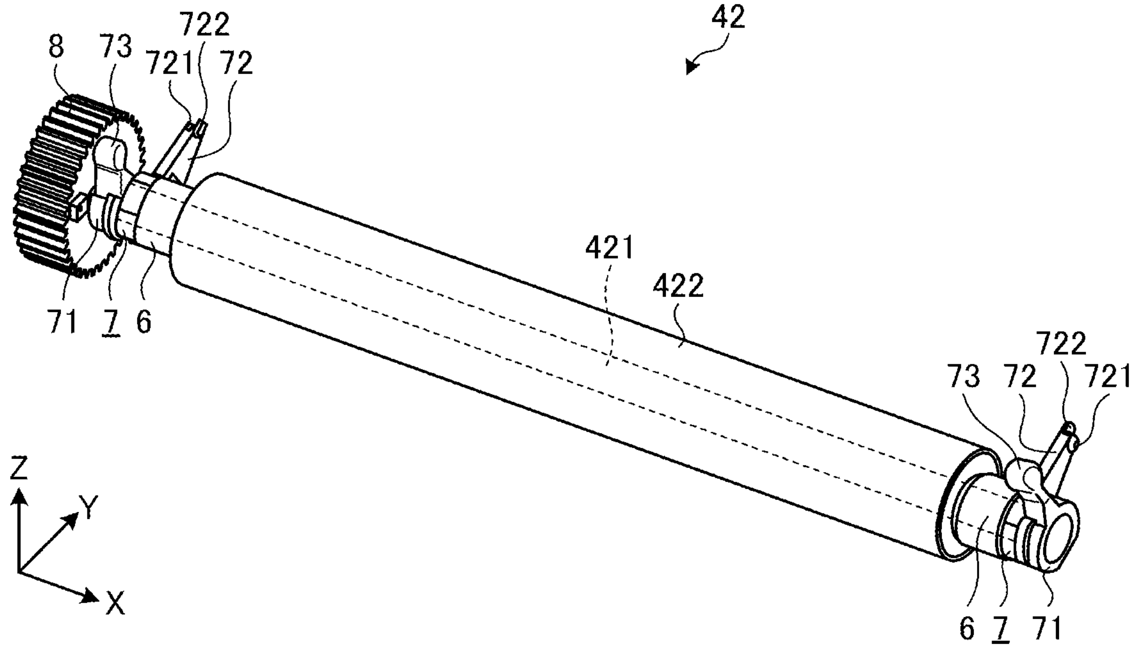
FIG. 4 is a perspective view showing an example of the external appearance of the platen and a bushing.

FIG. 4 is a perspective view showing an example of the external appearance of the platen 42 and a bushing 6. The platen 42 has a shaft 421 as its core and has a guide part 422 having a cylindrical outer circumferential surface. The guide part 422 is a part that comes into contact with the roll paper and is formed of an elastic material such as rubber. The shaft 421 protrudes from the two end parts of the guide part 422. As the rotation of a motor is transmitted to a gear 8 attached to one end part of the shaft 421, the platen 42 rotates.

The bushing 6 is an example of a pair of cylindrical parts surrounding the respective end parts of the shaft 421 (parts protruding from the two end parts of the guide part 422). The bushing 6 has a cylindrical shape. The inner diameter of the bushing 6 is greater than the outer diameter of the shaft 421.

Referring back to FIG. 3, the bushing 6 is located inside the frame 5. Reference number 7 represents a position adjustment member 7. A part more to the distal end side than the part surrounded by the bushing 6, of each end part of the shaft 421, is inserted in an interface or a hole 711 in the position adjustment member 7. The position adjustment member 7 makes the platen 42 eccentric from the bushing 6 and also attaches the platen 42 to the frame 5. The position adjustment member 7 will be described in detail later.

The thermal head 41 is supported by a bracket 410. The bracket 410 has an insert-and-hold part 411 at two end parts thereof. The insert-and-hold part 411 is a part holding the bushing 6 radially from both sides and defines an aperture, notch, or U-shaped groove 412 (see FIG. 7). The width of the groove 412 is substantially the same as or slightly greater than the diameter of the bushing 6. The depth of the groove 412 is at least greater than the radius of the bushing 6. As the bushing 6 fits in the groove 412, the position in the Y-axis direction of the heat generation elements provided in the thermal head 41 is fixed in relation to the bushing 6.

Figure 5:
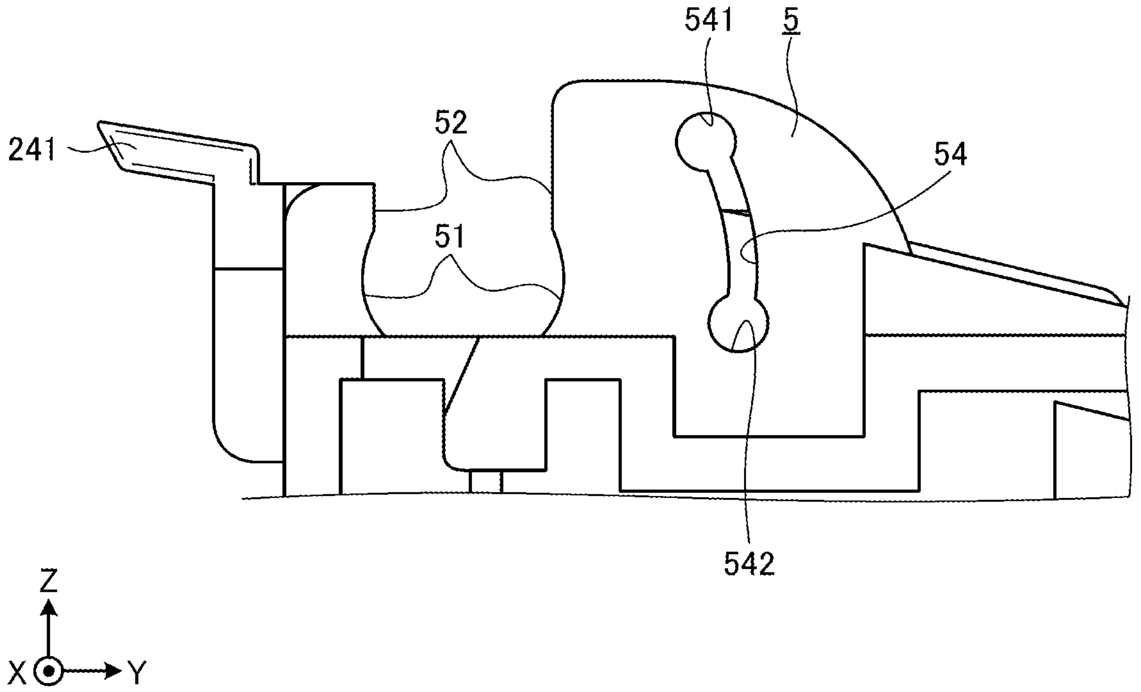
FIG. 5 is a side view showing an example of the shape of a frame.

FIG. 5 is a side view showing an example of the shape of the frame 5. The frame 5 defines a hole, aperture, or support groove surrounded by an arcuate edge 51. The support groove is an example of a hole for supporting the shaft 421 of the platen 42. The arcuate edge 51 has substantially the same diameter as the cylindrical outer circumferential surface of the position adjustment member 7 and supports the outer circumferential surface of the position adjustment member 7.

The support groove has an opening formed between straight edges 52 extending from the arcuate edge 51. The opening opens upward (in the positive direction along the Z-axis). The opening is a gap through which the position adjustment member 7 passes when being attached to or removed from the support groove. The spacing between the opposite edges 52 (that is, the width of the opening) is smaller than the diameter of the arc formed by the arcuate edge 51. The grooves 412 of the bracket 410 and the support groove (the straight edges 52 and the arcuate edge 51) of the frames 5 are axially offset (e.g., the frames 5 are laterally offset/spaced from and positioned outside of the bracket 410), but corporate to provide a passage for the shaft 421 of the platen 42 to extend through to engage with the position adjustment members 7. The paper support 241 is adjacent or proximate (e.g., in front of along the negative Y-axis) the support groove.

In the frame 5, a locking interface including an arcuate groove 54 and interfaces, detents, notches, cutouts, or recesses 541, 542 at the two end parts of the groove 54 is formed or defined. The arc formed by the groove 54 is concentric with the arc formed by the edge 51. The recesses 541, 542 are substantially circular holes (or depressions) and have a greater diameter than the width of the groove 54. The groove 54 and the recesses 541, 542 will be described in detail later.

Figure 6A:
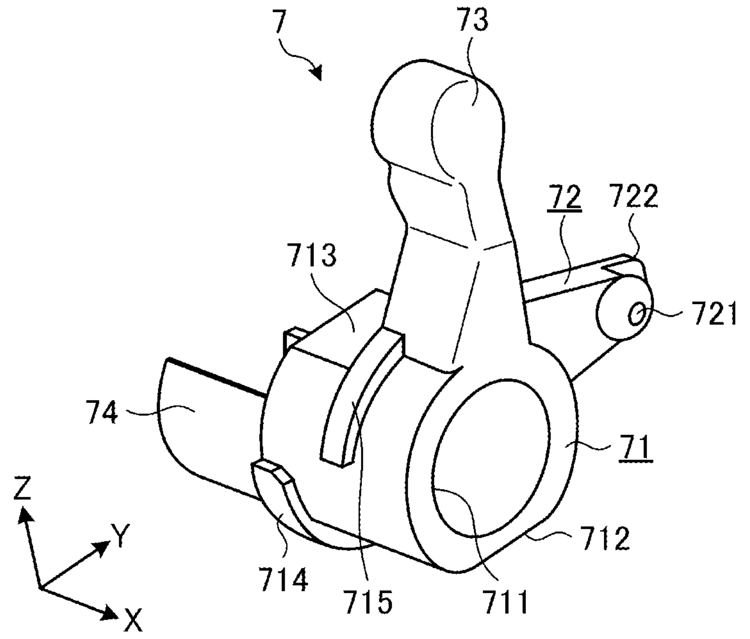
FIG. 6A is a perspective view showing an example of the external appearance of a position adjustment member.
Figure 6B:
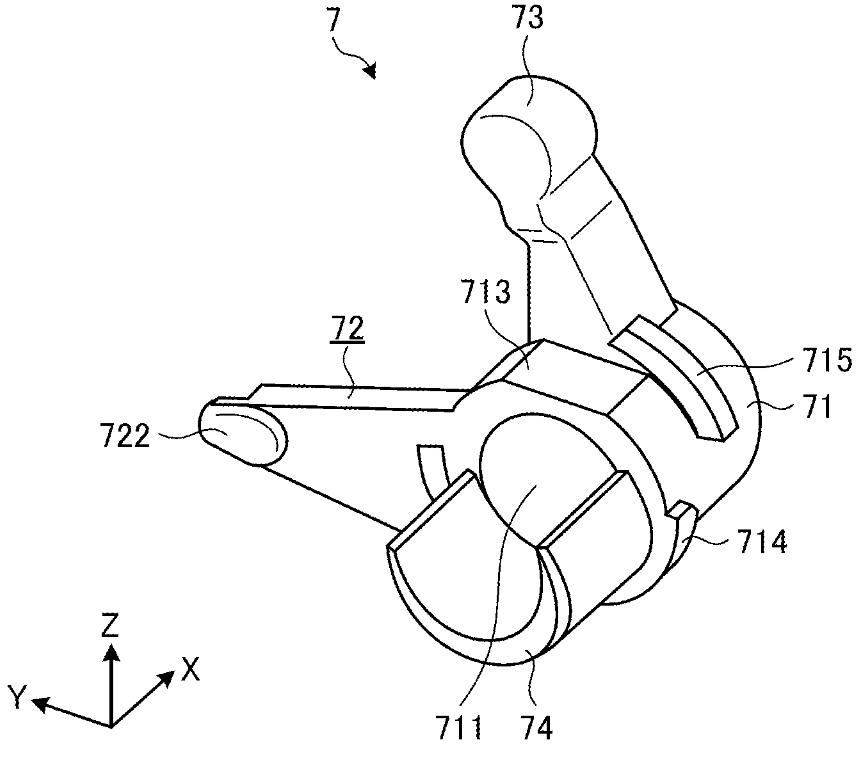
FIG. 6B is a perspective view showing an example of the external appearance of the position adjustment member.
Figure 6C:
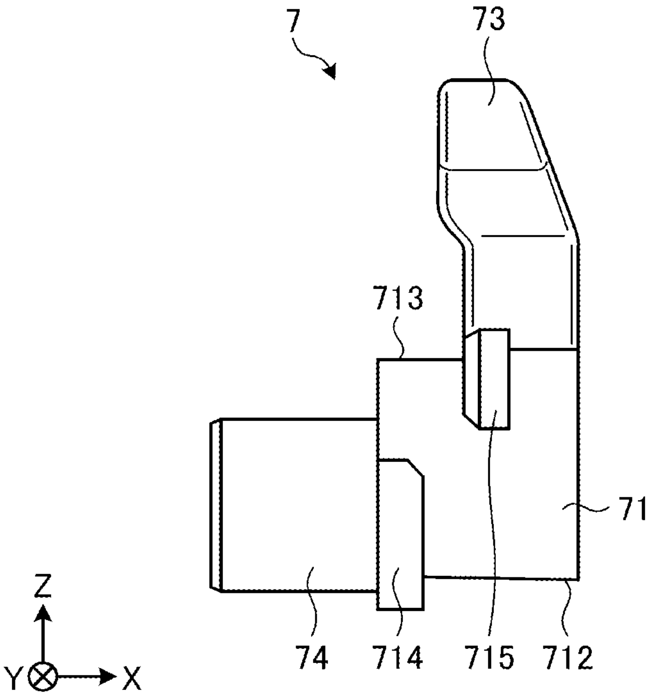
FIG. 6C is a perspective view showing an example of the external appearance of the position adjustment member.

FIGS. 6A to 6C are perspective views showing an example of the external appearance of the position adjustment member 7. FIGS. 6A to 6C show the position adjustment member 7 from different directions. The position adjustment member 7 includes a base or support part 71, a first arm or leaf spring 72 extending from the support part 71 and including a protrusion 721 positioned at a distal end part thereof, and a second arm or lever 73 extending from the support part 71. According to an example embodiment, the support part 71, the leaf spring 72, and the lever 73 have a unitary structure. The lever 73 is a handle for rotating the support part in relation to the frame. According to an exemplary embodiment, the leaf spring 72 and the lever 73 are angularly offset from each other (e.g., by about 30, 45, 60, 65, 70, 75, 80, 85, 90, 105, etc. degrees) about the support part 71.

The support part 71 is configured as a pair of support parts fitted in the support grooves of the frames 5. The support part 71 has a cylindrical shape in which the hole 711 having a cylindrical inner circumferential surface is formed at the center. The diameter dimension of the hole 711 is substantially the same as the diameter dimension of the shaft 421 and is a dimension that does not disturb the rotation of the shaft 421.

The outer circumferential surface of the support part 71 is cylindrical except for planar surfaces or parts 712, 713 provided at two sites. The planar parts 712, 713 are substantially parallel to each other. The distance between the planar part 712 and the planar part 713 is substantially the same as the width of the opening (distance between the edges 52).

The support part 71 is inserted in the support groove from the opening in the state where the planar parts 712, 713 are substantially parallel to a ZX plane and the opposite edges 52. As the planar parts 712, 713 pass between the opposite edges 52, the support part 71 becomes rotatable in relation to the arcuate edge 51.

The support part 71 also has arcuate ribs 714, 715 protruding from the cylindrical outer circumferential surface. The ribs 714, 715 are positioned to engage with a portion of the frame 5 (e.g., the interior and exterior surfaces of the arcuate edge 51) to prevent misalignment of the support part 71 from the frame 5 in the direction of the width of the printer 1 (X-axis direction). The space in the X-axis direction between the rib 714 and the rib 715 corresponds to the thickness dimension of the plate member forming the frame 5. In the state where the bushing 6 is correctly attached to the frame 5, the arcuate edge 51 of the support groove is held between the rib 714 and the rib 715. Thus, the position in the X-axis direction of the bushing 6 and the platen 42 is fixed in relation to the frame 5.

The leaf spring 72 has the protrusion 721 at a distal end part thereof. The protrusion 721, along with the recesses 541, 542 formed in the frame 5, forms a rotation stopper that defines the rotational position of the support part 71. The rotation stopper is formed by a combination of the protrusion 721 provided in a unified manner with the support part 71, and the recesses 541, 542 defined in the frame 5 at the opposing ends of the grove 54.

According to an example embodiment, the protrusion 721 is a substantially hemispherical protrusion protruding from the leaf spring 72. The diameter of the protrusion 721 is approximately the same as the diameter of the recesses 541, 542 at the two end parts of the groove 54. The protrusion 721 moves along the groove 54 with the rotation of the support part 71, then fits in the recesses 541, 542, and thus defines the rotational position of the support part 71.

The leaf spring 72 also has, at its distal end, a tab or knob 722 functioning as a handhold for a user to elastically deform the leaf spring 72 into the direction opposite to the protruding direction of the protrusion 721. The knob 722 is used to detach, dislodge, or remove the protrusion 721 from the groove 54 when removing the platen 42 and the position adjustment member 7 from the frame 5.

When moving the protrusion 721 from one of the recesses 541, 542 to the other, the leaf spring 72 need not be deformed by pulling the knob 722 or the like. The protrusion 721 is substantially hemispherical. Therefore, with the rotation of the support part 71, the protrusion 721 exits the recesses 541, 542 and slides along the groove 54.

An extension, insert, or filling 74 is a part of the support part 71 and protrudes from the inner surface of the support part 71. According to an example embodiment, the filling 74 is crescent-shaped at a cross section orthogonal to the axial direction of the platen 42 (X-axis direction), that is, at a cross section parallel to a YZ plane, for example, as shown in FIG. 6B.

Figure 7:
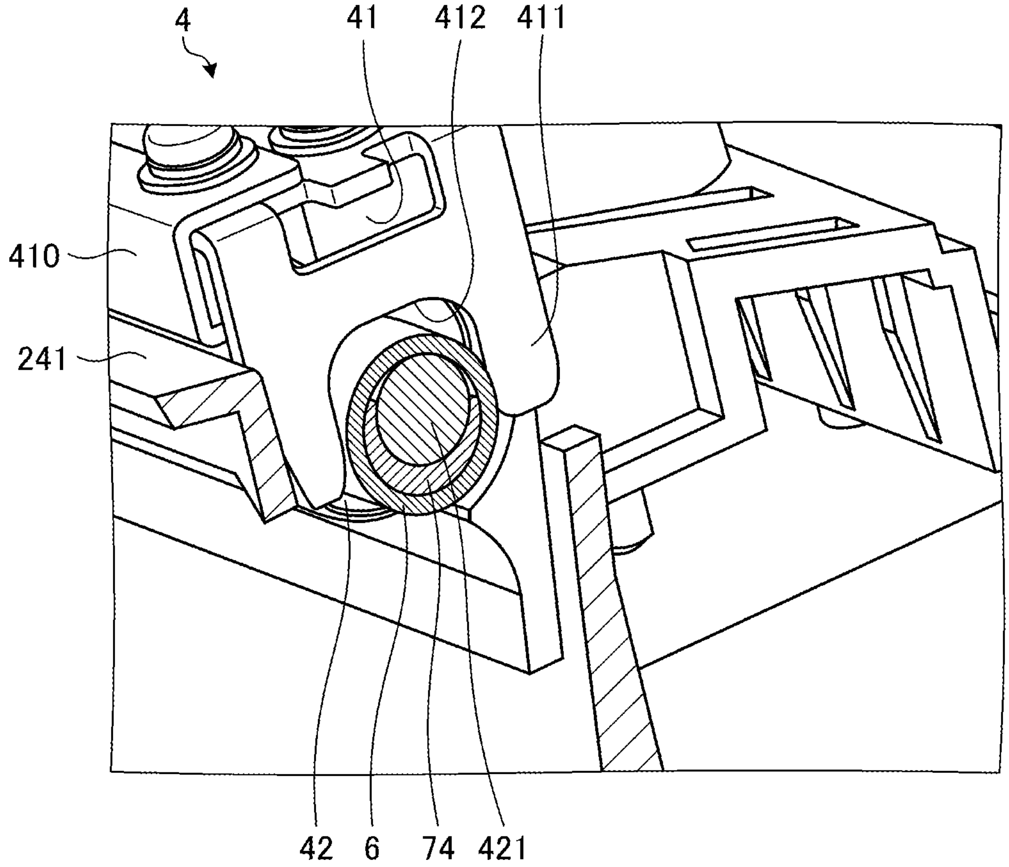
FIG. 7 is a cross-sectional view for explaining the state of a shaft and a filling inside the bushing.

FIG. 7 is a cross-sectional view parallel to a YZ plane, taken at a slicing position that slices the bushing 6 between the bracket 410 and the frame 5. FIG. 7 is a cross-sectional view for explaining the state of the shaft 421 and the filling 74 inside the bushing 6.

The filling 74 is a part inserted into the bushing 6 from a side thereof opposite to the shaft 421. The filling 74 is formed in such a shape that, when inserted in the bushing 6, the filling 74 (*i*) offsets, pushes, forces, biases, or otherwise moves the shaft 421 toward one side of the interior of the bushing 6 to a position in contact with the inner circumferential surface of the bushing 6 and (ii) substantially fills the remaining space inside the bushing 6 unoccupied by the shaft 421.

As described above, the frame 5, the bushing 6, and the position adjustment member 7 are provided at each of the two end parts of the platen 42. Up to FIG. 7, the position adjustment member 7 on the right side of the printer 1 when facing the paper discharge port 24 is described as an example. The other position adjustment member, that is, the position adjustment member on the left when facing the paper discharge port 24, is represented by reference number 70 in FIGS. 8A and 8B. The position adjustment member 70 has such a shape that the position adjustment member 70 and the position adjustment member 7 shown in FIGS. 6A to 6C or the like are symmetric with respect to a YZ plane.

Figure 8A:
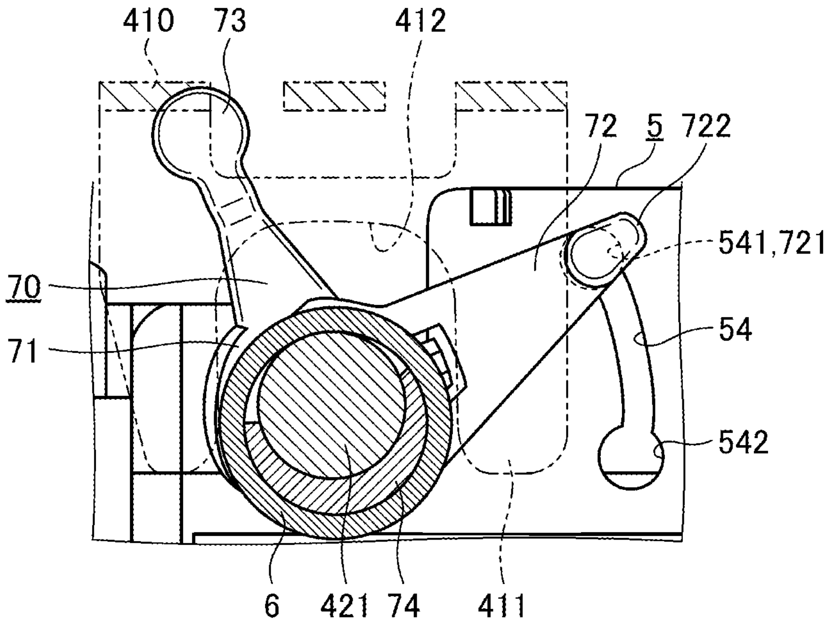
FIG. 8A explains the working of the position adjustment member.
Figure 8B:
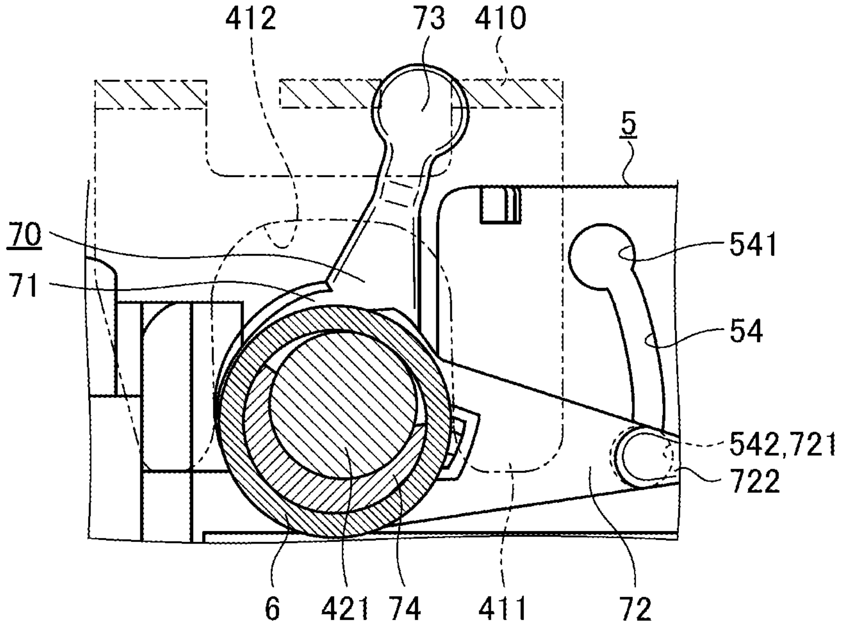
FIG. 8B explains the working of the position adjustment member.

In such a configuration, the position adjustment members 7, 70 operate as shown in FIGS. 8A and 8B. With this operation, the platen 42 slightly moves in the direction of conveyance of paper in relation to the thermal head 41. This movement will now be described. The position adjustment member 70 shown in FIGS. 8A and 8B is the position adjustment member on the left side of the printer 1 when facing the paper discharge port 24.

FIGS. 8A and 8B explain the working of the position adjustment member 70. FIGS. 8A and 8B are cross-sectional views parallel to a YZ plane, taken at a slicing position that slices the bushing 6 between the bracket 410 and the frame 5. The slicing position in FIGS. 8A and 8B corresponds to the slicing position in FIG. 7. However, FIG. 7 shows the cross section as viewed from outside the frame 5, whereas FIGS. 8A and 8B show the cross section as viewed from inside the frame 5.

The support part 71 is rotatable in relation to the support groove in the frame 5. The axial center of the bushing 6 is coaxial with the axis of rotation of the support part 71. The inside of the bushing 6 is filled by the shaft 421 and the filling 74. The shaft 421 is moved to one side in the bushing 6 and comes in contact with the inner circumferential surface of the bushing 6. In this state, the axial center of the shaft 421 and the axial center of the bushing 6 are not coincident with each other but are offset or misaligned from each other such that the shaft 421 is eccentric from the central axis of the bushing 6. In this way, the support part 71 supports the shaft 421 while making the shaft 421 eccentric from the axial center of the bushing 6 via the filling 74.

With the rotation of the support part 71, the bushing 6 rotates, too. With this rotation, the axial center of the bushing 6 does not move but the axial center of the shaft 421 inside the bushing 6 moves. With the movement of the axial center of the shaft 421, the contact position between the guide part 422 of the platen 42 and the thermal head 41 changes. As the contact position between the platen 42 and the thermal head 41 changes, the holding state of the paper held between these parts changes.

FIG. 8A shows a state where the rotation is stopped at such an angle that the protrusion 721 fits in the recess 541. FIG. 8B shows a state where the rotation is stopped at such an angle that the protrusion 721 fits in the recess 542. At the position shown in FIG. 8A, the shaft 421 is located more or further downstream in the direction of conveyance of the paper than at the position shown in FIG. 8B. As shown in the illustrations, the rotation stopper defines the rotational position of the support part 71 in such a way as to be able to set the contact position between the thermal head 41 and the platen 42, which changes according to the angle of the rotation of the support part 71, to a plurality of positions (in this embodiment, two positions).

The relationship between the positional relationship between the platen 42 and the thermal head 41 holding the paper, and characteristics of the paper, will now be described briefly. The paper changes in flexibility (firmness), depending on various factors such as thickness and material. In the structure of the printer 1, a firm paper (that is not flexible) strongly pushes against the heat generation elements of the thermal head 41. Therefore, it is preferable that the contact position between the platen 42 and the thermal head 41 is further upstream in the direction of conveyance of the paper. Meanwhile, in order to securely push a paper that is not firm (i.e., flexible) against the heat generation elements of the thermal head 41, it is preferable that the contact position between the platen 42 and the thermal head 41 is further downstream in the direction of conveyance of the paper.

In the above description, an example of the advantages of making the contact position between the platen 42 and the thermal head 41 changeable is briefly described, using the firmness of the paper as an example. In actual implementation, contact positions corresponding to various circumstances may be configured to be selectable.

The user using the printer 1 as described above operates the lever 73 to rotate the support part 71 in relation to the frame 5 and thus moves the platen 42 in the direction of conveyance of the paper according to the characteristics of the paper.

In this way, according to this embodiment, the support part 71 attaching the platen 42 rotatably to the frame 5 is provided with a structure for changing the position of the platen 42 in the direction of conveyance of the paper. Therefore, the number of components need not be increased in order to implement the structure, and an installation space for this need not be separately provided. Thus, the structure for adjusting the contact position between the thermal head and the platen can be provided inexpensively and in a small space.

The above embodiment can be implemented with a suitable modification by changing a part of the configurations or functions of the above devices. For example, in the above embodiment, the bushing 6 and the support part 71 are separate components, wherein in actual implementation, the bushing 6 (an example of the cylindrical part) may be formed in a unified manner with the support part 71. Also, for example, in the embodiment, the rotation stopper positions (recesses 541, 542) of the position adjustment member 7 are provided at two positions, whereas in actual implementation, the rotation stopper positions may be provided at a plurality of positions that are three or more positions.

While some embodiments have been described, these embodiments are presented simply as examples and are not intended to limit the scope of the disclosure. These novel embodiments can be carried out in various other forms and can include various omissions, replacements, modifications, and combinations without departing from the spirit and scope of the disclosure. These embodiments and the modifications thereof are included in the spirit and scope of the disclosure and also included in the scope of the claims and equivalents thereof.

What is claimed is:

1. A printer comprising:

a thermal head including a plurality of heat generation elements arranged in a line;

a platen configured to convey a printing medium held between the platen and the thermal head, the platen including a shaft;

a pair of bushings positioned proximate opposing ends of the shaft;

a bracket configured to support the thermal head, the bracket defining a groove at opposing ends thereof;

a pair of frames positioned proximate the opposing ends of the bracket, each of the pair of frames defining an aperture that cooperates with the groove to define a passage through which a portion of the shaft extends;

a pair of supports, each of the pair of supports is positioned to engage with the aperture of a respective one of the pair of frames, the pair of supports are rotatable within the apertures about an axis of rotation, and the pair of supports are positioned to support the opposing ends of the shaft, each of the pair of supports including an extension received within a respective one of the pair of bushings such that the extension is positioned between an interior surface of the respective bushing and the shaft, the extension causing the shaft to be eccentric from the axis of rotation; and a rotation stopper configured to selectively hold at least one of the pair of supports in one of a plurality of a rotational positions, each of the plurality of rotational positions providing a different contact position between the thermal head and the platen.

2. The printer of claim 1, wherein each of the pair of supports includes a base that defines an interface that receives a respective end of the opposing ends of the shaft, wherein the extension extends from the base and is received within the respective one of the pair of bushings, wherein the extension is shaped such that, when inserted into the respective one of the pair of bushings, the extension moves the shaft to a position in contact with an inner circumferential surface of the respective bushing and substantially fills a remaining space inside the respective bushing.

3. The printer of claim 2, wherein the extension is crescent-shaped.

4. The printer of claim 1, wherein at least one of the pair of supports includes a protrusion and at least one of the pair of frames defines an interface, wherein the protrusion and the interface provide the rotation stopper, and wherein the protrusion is configured to engage with the interface to selectively hold the at least one of the pair of supports in one of the plurality of rotational positions.

5. The printer of claim 1, wherein each of the pair of bushings is integrally formed with a respective one of the pair of supports.

6. The printer of claim 1, wherein at least one of the pair of supports includes a lever configured to facilitate rotating the pair of supports about the axis of rotation within the apertures of the pair of frames.

7. A printer comprising:

a thermal head including with a heating element;

a bracket configured to support the thermal head, the bracket defining a first groove positioned at a first bracket end thereof and a second groove positioned at an opposing second bracket end thereof;

a platen including a guide and a shaft positioned within the guide;

a first bushing positioned proximate a first shaft end of the shaft;

a second bushing positioned proximate an opposing second shaft end of the shaft;

a first frame positioned proximate the first bracket end of the bracket, the first frame defining (i) a locking interface and (ii) a first aperture that cooperates with the first groove to define a first passage through which the first shaft end of the shaft extends;

a second frame positioned proximate the opposing second bracket end of the bracket, the second frame defining a second aperture that cooperates with the second groove to define a second passage through which the opposing second shaft end of the shaft extends;

a first support including:

a first base defining a first shaft interface that receives the first shaft end of the shaft, the first base in engagement with the first aperture of the first frame;

a first arm extending from the first base, the first arm configured to engage with the locking interface;

a second arm extending from the first base, the second arm configured to function as a lever to rotate the first base within the first aperture and manipulate the first arm relative to the locking interface; and a first insert extending from the first base and received within the first bushing; and a second support including:

a second base defining a second shaft interface that receives the opposing second shaft end of the shaft, second base in engagement with the second aperture of the second frame; and a second insert extending from the second base and received within the second bushing;

wherein the first insert and the second insert engage with the shaft such that the shaft is offset from a central axis defined by the first bushing and the second bushing; and wherein manipulation of the lever causes the first arm to move relative to the locking interface and change a point of contact between the platen and the thermal element.

8. The printer of claim 7, wherein the first bracket end of the bracket and the first frame are laterally offset from each other.

9. The printer of claim 7, wherein the first base of the first support includes at least one rib positioned to engage with at least one of an interior surface or an exterior surface of the first frame.

10. The printer of claim 7, wherein the first base is substantially cylindrical with a pair of planar surfaces positioned at opposing sides of the first base.

11. The printer of claim 10, wherein the first aperture is defined by an arcuate edge and a pair of straight edges extending from the arcuate edge, wherein a width between the pair of straight edges is less than a diameter of the arcuate edge, and wherein the first base can be inserted into the first aperture by aligning the pair of planar surfaces with the pair of straight edges.

12. The printer of claim 7, wherein the first insert and the second insert are crescent-shaped.

13. The printer of claim 7, wherein the locking interface is a first locking interface and the lever is a first lever, wherein the second frame defines a second locking interface, and wherein the second support further includes:

a third arm extending from the second base, the third arm configured to engage with the second locking interface; and a fourth arm extending from the second base, the fourth arm configured to function as a second lever to rotate the second base within the second aperture and manipulate the third arm relative to the second locking interface.

14. The printer of claim 7, wherein the first bushing and the first base are integrally formed.

15. The printer of claim 7, wherein the locking interface includes an arcuate grove including a plurality of retaining interfaces positioned therealong, and wherein the first arm include a protrusion that selectively engages with each of the plurality of retaining interfaces to set the point of contact between the platen and the thermal element.

16. The printer of claim 15, wherein the first arm includes a tab positioned at a distal end thereof that facilitates flexing the first arm and disengaging the protrusion from the locking interface.

17. The printer of claim 7, further comprising a gear coupled to at least one of the first shaft end or the second shaft end of the shaft.

18. The printer of claim 17, wherein first support is positioned between the gear and the first bushing.

19. The printer of claim 17, wherein second support is positioned between the gear and the second bushing.

* * * * *